United States Patent Office 3,228,926
Patented Jan. 11, 1966

3,228,926
POLYPEPTIDES
Heini Kappeler, Birsfelden, and Robert Schwyzer, Riehen, Switzerland, assignors to Ciba Corporation, New York, N.Y., a corporation of Delaware
No Drawing. Filed May 1, 1962, Ser. No. 191,443
Claims priority, application Switzerland, May 4, 1961, 5,242/61; Nov. 24, 1961, 13,753/61
4 Claims. (Cl. 260—112.5)

The present invention provides a process for the manufacture of the tetracosapeptides of the formula L-seryl-L-tyrosyl-L-seryl-L - (X) - L-glutampl-L-histidyl-L-phenyl-alanyl-L-arginyl-L-tryptophyl-glycyl - L-lysyl-L-proply-L-valyl-glycyl-L-lysyl-L-lysyl-L-arginyl-L - arginyl-L-propyl-L-valyl-L-lysyl-L-valyl-L-tyrosyl-L-prolin and of the corresponding compound which contains the radical of glutamine instead of the gultamyl radical and their derivatives, acid addition salts, and heavy metal complexes. X is the radical of an α-lower alkyl-α-aminoacetic acid whose lower alkyl radical contains at most four carbon atoms and is unsubstituted or substituted by a mercapto or lower alkylmercapto group, preferably by the methylmercapto group, or its sulfoxide or sulfone radical, being for example alanyl, valyl, leucyl, isoleucyl, α-aminobutyryl, cysteyl, methionyl and its sulfoxide and sulfone. Heavy metal complexes are especially those of zinc, copper and cobalt.

The present application relates more especially to the manufacture of L-seryl-L-tyrosyl-L-seryl-L-methionyl-L-glutamyl-L-histidyl - L-phenylalanyl - L-arginyl-L-tryptophyl-glyclyl - L-lysyl-L-prolyl - L-valyl-glycyl-L-lysyl-L-lysyl - L-arginyl-L-arginyl - L-prolyl-L-valyl - L-lysyl-L-valyl-L-tyrosyl-L-prolin in pure form, its sparingly soluble zinc complex, and the corresponding glutaminyl compound.

Derivatives are above all functional derivatives such as esters, for example lower alkyl esters, e.g. methyl, ethyl, propyl, isopropyl, isobutyl, tertiary butyl esters, amides and hydrazides, as well as N-substitution products such as N-acyl, for instance N-lower alkanoyl, more especally N-acetyl derivatives and compounds containing the usual amino protecting groups.

The new compounds display a considerably adrenocorticotropic activity and are intended to be used in human and veterinary medicine as chemically pure and uniform compounds in place of ACTH. Suitable for the preparation of synthetic corticotropine derivatives having a prolonged activity is in particular the aforementioned sparingly soluble zinc complex. The compounds may also be used as intermediates for the manufacture of medicaments containing a longer chain of amino acids, such as the adrenocorticotropic hormones themselves.

The new tetracosapeptides are obtained by the methods known for the manufacture of peptides, for which purpose the amino acids may be linked together in the order of succession specified above singly or in the form of performed small peptide units.

Inter alia, one of the amino acid molecules or peptide molecules in the form of an ester may be linked with a further molecule of an amino acid or peptide containing a protected amino group in the present of a condensing agent such as a carbodiimide or a phosphorus acid ester halide, or the amino acid ester or peptide ester containing a free amino group may be reacted with an amino acid or a peptide containing an activated carboxyl group (and a protected amino group), for example an acid halide, azide, anhydride, imidazolide, isoxazolide (for example from N - ethyl-5-phenyl-isoxazolium-3'-sulfonate; see Woodward et al., J. Am. Chem. Soc, 89 page 1011 [1961]) or an activated ester such as cyanomethyl ester or carboxymethyl thiol ester. Conversely an amino acid or a peptide containing a free carboxyl group (and a protected amino group) can be reacted with an amino acid or a peptide containing an activated amino group (and a protected carboxyl group), for example with a phosphite amide. All aforementioned methods can be used for forming peptide bonds according to the present invention but the processes used in the examples are particularly advantageous.

As mentioned above there are various possibilities available for synthesising the tetracosa peptide from the individual amino acids or small peptide units. According to one process, for example, the decapeptide L-seryl-L-tyrosyl - L-seryl - L-(X) - L-glutamyl-(or glutaminyl)-L-histidyl-L-phenylalanyl - L-arginyl-L-tryptophylglycine is condensed with the tetradeka peptide L-lysyl-L-prolyl-L-valyl-glycyl-L-lysyl-L-lysyl-L-arginyl-L-arginyl-L - proply-L-valyl-L-lysyl-L-valyl-L-tyrosyl-L-prolin as represented, for example, in Table 1 for the compound containing as the fourth amino acid L-methionine and as the fifth amino acid L-glutamic acid. In this Table BOC represents a tertiary butyloxycarbonyl group, tBu a tertiary butyl group and iBu an isobutyl group. The decapeptide used as starting material can be prepared by the process described in U.S. patent application No. 114,636, filed June 5, 1961 by R. Schwyzer et al.

The tetradecapeptide is obtained, for example, by the reaction scheme shown in the Table 2.

TABLE 1

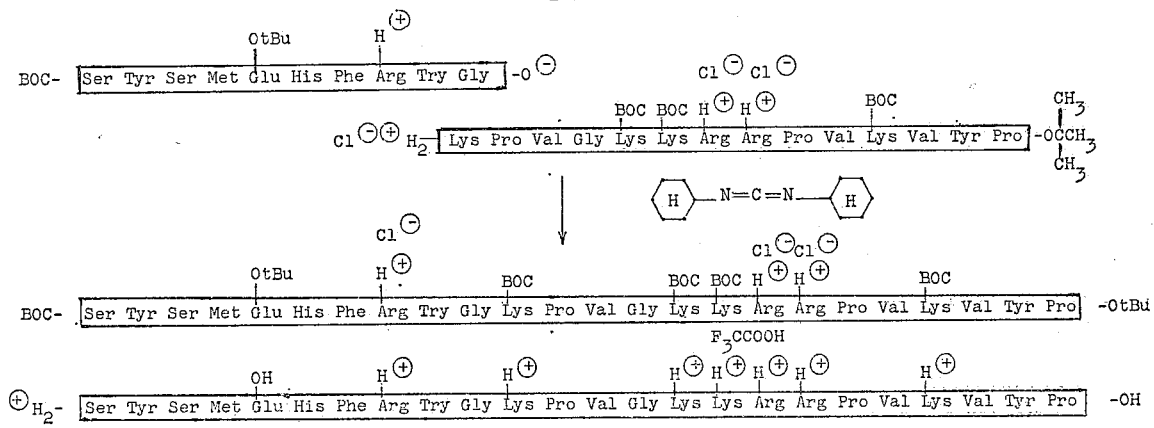

TABLE 2

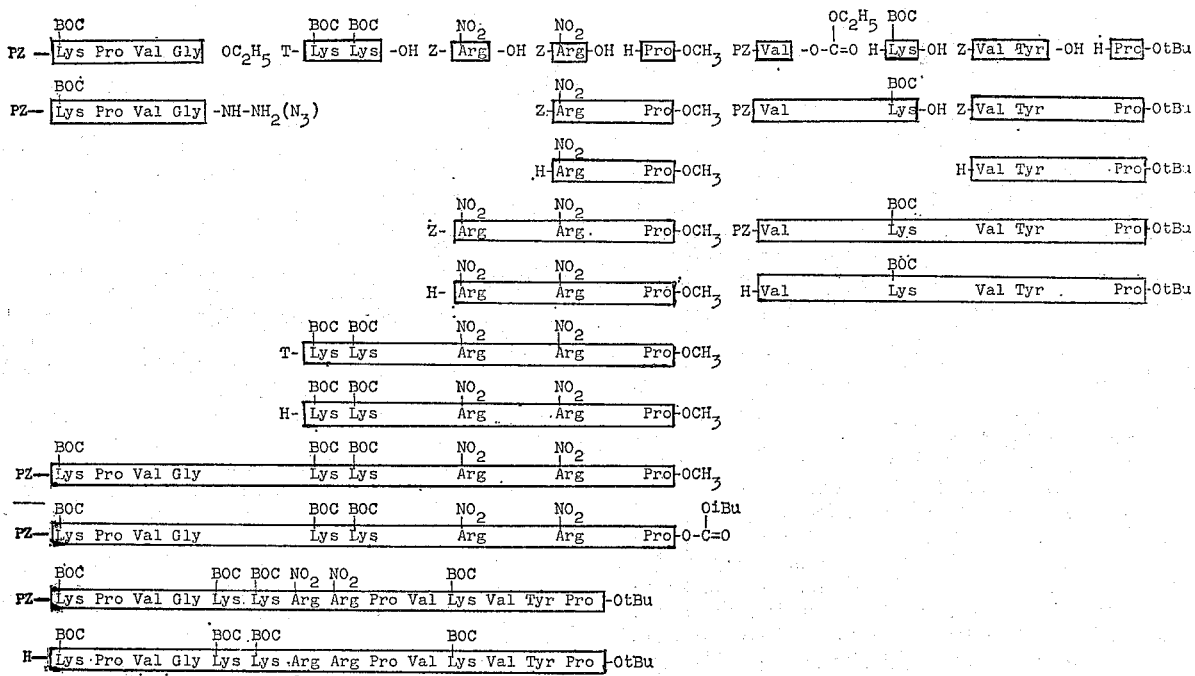

The tetracosapeptide is also obtained, for example, by condensing the tetrapeptide L-seryl-L-tyrosyl-L-seryl-L-(X) with the eicosa peptide L-glutamyl-(or glutaminyl)-L-histidyl-L-phenylalanyl-L-arginyl-L-tryptophyl - glycyl-L-lysyl-L-prolyl-L-valyl - glycyl-L-lysyl-L-lysyl-L-arginyl-L - arginyl - L-prolyl-L-valyl-L-lysyl-L-valyl-L-tyrosyl-L-prolin, for example as shown in the Table 3. The tetrapeptide derivative used as starting material can be prepared by the process described in the afore-mentioned U.S. patent application No. 114,636 and the hexapeptide by the process of U.S. patent application No. 114,609, filed June 5, 1961 by R. Schwyzer et al.

Any free functional groups not participating in the reaction are advantageously protected, more especially by hydrolysing or reducing radicals that are easy to eliminate, thus the carboxyl group preferably by esterification (for example with methanol, tertiary butanol, a benzyl alcohol or para-nitrobenzyl alcohol), the amino group for example by introducing the tosyl or trityl radical or the carbobenzoxy group or a colored protective group, such as the para-phenylazo-benzyloxy-carbonyl group or the para - (para'-methoxy-phenylazo) - benzyloxy - carbonyl group or more especially the tertiary butyloxy-carbonyl radical. For protecting the amino group in the guanido grouping of arginine the nitro group may be used, but it is not absolutely necessary to protect the aforementioned amino group of arginine during the reaction.

The conversion of a protected mercapto or amino group into a free group and the conversion of a functionally converted carboxyl group into a free carboxyl group in the course of the process used for the manufacture of the tetracosapeptides and intermediates is carried out in the known manner by treatment with a hydrolysing or reducing agent respectively.

The invention further includes any variant of the process in which an intermediate obtained at any stage of the process is used as starting material and the remaining step or steps is/are carried out or the process is terminated at any stage thereof, and it includes also the intermediates thus obtained.

Depending on the reaction conditions used the new compounds are obtained in the form of bases or of their salts. From the salts the bases can be prepared in known manner. When the bases are reacted with acids suitable for forming therapeutically acceptable salts, there are obtained salts such, for example, as those of inorganic acids such as hydrohalic acids, for example hydrochloric or hydrobromic acid, perchloric, nitric or thiocyanic acids, sulfuric or phosphoric acids or organic acids such as formic, acetic, propionic, glycollic, lactic, pyruvic, oxalic, malonic, succinic, maleic, fumaric, malic, tartaric, citric, ascorbic, hydromaleic, dihydroxymaleic, benzoic, phenylacetic, 4-aminobenzoic, 4-hydroxybenzoic, anthranilic, cinnamic, mandelic, salicylic, 4-amino-salicylic, 2-phenoxybenzoic, 2-acetoxy-benzoic, methanesulfonic, ethanesulfonic, hydroxyethanesulfonic, benzenesulfonic, para-toluenesulfonic, naphthalenesulfonic or sulfanilic acid.

The tetracosapeptides obtained by the present process can be used in the form of pharmaceutical preparations containing the peptide in admixture with an organic or inorganic pharmaceutical excipient suitable for enternal or parenteral administration. Suitable excipients are substances that do not react with the polypeptides such, for example, as gelatine, lactose, glucose, sodium chloride, starches, magnesium stearate, talc, vegetable oils, benzyl alcohols, gums, poly-alkyleneglycols, white petroleum jelly, cholesterol or other known medicinal excipients. The pharmaceutical preparations may be, for example, tablets, dragees, ointments, powders, creams or suppositories, or in liquid form solutions suspensions or emulsions. They may be sterilized and/or may contain assistants such as preserving, stabilizing, wetting or emulsifying agents. They may further contain other therapeutically useful substances.

The following examples illustrate the invention.

Example 1

PZ-Lys-(BOC)-Pro-Val-Gly-NH-NH₂

A mixture of 1.15 grams (1.5 millimols) of PZ-Lys-(BOC)-Pro-Val-Gly-OCH₃ (U.S. patent application No. 46,893, filed August 2, 1960 by R. Schwyzer et al.), 15 cc. of absolute methanol and 0.6 cc. of hydrazine hydrate is refluxed for one hour, evaporated to dryness and the hydrazide is precipitated with much ether. The initially gelatinous product solidifies when scratched with a glass rod. It is filtered off and thoroughly washed with ether on the suction filter. After drying over sulfuric acid there are obtained 1.1 grams of PZ-tetrapeptide hydrazide melting at 130 to 131° C.

A specimen recrystallized from acetonitrile has the

TABLE 3

Z-[Ser Tyr Ser Met]-[Glu His Phe Arg(NO₂) Try Gly]-OtBu    BOC-[Lys Pro Val Gly Lys Arg(NO₂) Arg Pro Val Lys Val Tyr Pro]-OtBu

Z-[Ser Tyr Ser Met]-NH-NH₂(N₃)    H-[Lys Pro Val Gly Lys Arg(NO₂) Arg Pro Val Lys Val Tyr Pro]-OtBu
                                                       BOC     BOC(NO₂)(NO₂)      BOC

Z-[Ser Tyr Ser Met]-[Glu His Phe Arg(NO₂) Try Gly]-[Lys Pro Val Gly Lys Arg(NO₂) Arg Pro Val Lys Val Tyr Pro]-OtBu
                              OtBu                        BOC      BOC NO₂ NO₂       BOC

Z-[Ser Tyr Ser Met]-[Glu His Phe Arg(NO₂) Try Gly]-[Lys Pro Val Gly Lys Arg(NO₂) Arg Pro Val Lys Val Tyr Pro]-OtBu
                              OtBu                         BOC  BOC         BOC

H-[Ser Tyr Ser Met]-[Glu His Phe Arg Try Gly]-[Lys Pro Val Gly Lys Arg Arg Pro Val Lys Val Tyr Pro]-OtBu
         OtBu                                        BOC  BOC         BOC

H⊕ ↓ OH⊖

H-[Ser Tyr Ser Met]-[Glu His Phe Arg Try Gly]-[Lys Pro Val Gly Lys Arg Arg Pro Val Lys Val Tyr Pro]-OH melting point F=163–165° C. The hydrazide is readily soluble in cold acetic acid of 25% strength.

*Example 2*

Z-Arg-(NO₂)-Pro-OCH₃

3.06 grams (23.7 millimols) of proline methyl ester in 20 cc. of acetonitrile are added to a solution of 7.18 grams (20.3 millimols) of carbobenzoxy-nitro-L-arginine in 20 cc. of dimethylformamide. The mixture is cooled with ice and sodium chloride to about −5° to −10° C. and then treated with a solution of 4.9 grams of dicyclohexyl carbodiimide in 12 cc. of dimethylformamide:acetonitrile=1:1. The reaction solution is then diluted with 20 cc. of ice-cold acetonitrile and kept for 17 hours at 0° C. The urea formed is filtered off, washed with acetonitrile and the solution is treated with 5 drops of glacial acetic acid. After 30 minutes the whole is evaporated to dryness, the residue taken up in ethyl acetate, the precipitated urea is once more filtered off through cotton wool and the ethyl acetate solution is washed with 3 x 10 cc. of N-hydrochloric acid, then twice with water and finally with n-sodium bicarbonate solution until, when the alkaline extracts are acidified, no turbidity appears; finally the whole is washed with water until neutral.

When the dried ethyl acetate solution is concentrated to a small volume, the carbobenzoxy dipeptide ester precipitates substantially quantitatively. Yield: 6.16 grams (65.5% of the theoretical). The product melts at 155 to 157° C. after having sintered at 153° C.

*Example 3*

H-Arg-(NO₂)-Pro-OCH₃

8.4 grams of Z-Arg(NO₂)-Pro-OCH₃ are dissolved with heating in 27 cc. of glacial acetic acid and then treated at room temperature with 27 cc. of approximately 4 N-hydrogen bromide solution in glacial acetic acid. After one hour the whole is concentrated in vacuum at 40° C. to a small volume and the decarbobenzoxy solution product is precipitated with much absolute ether. The initially tacky product is treated with absolute ether until it forms a fine powder. For purification the dihydrobromide of the dipeptide ester is once more precipitated from methanol+ether. The pale yellowish compound is taken up in 4 cc. of water, 150 cc. of chloroform are added and the mixture is cooled to 0° C. in an ice bath. While whirling the mixture vigorously, solid potassium carbonate is added in portions until all water has been consumed and the potassium carbonate separates in solid form; the latter is once more extracted with fresh chloroform and the combined chloroform extracts are dried over anhydrous potassium carbonate and filtered through a little Celite in a G₄ glass suction filter. After having evaporated the chloroform at 40° C. there are obtained 5.5 grams (=90% of the theoretical yield) of nitro-L-arginyl-proline methyl ester. The compound is further worked up as it is.

*Example 4*

Z-Arg(NO₂)-Arg(NO₂)-Pro-OCH₃

8.34 grams (25.2 millimols) of H-Arg(NO₂)-Pro-OCH₃ in 25 cc. of freshly distilled dimethylformamide are combined with a solution of 8.92 grams (25.2 millimols) of Z-Arg(NO₂)-OH, and the mixture is diluted with 50 cc. of acetonitrile and then cooled to −10° C. The whole is kept for 30 minutes at −10° C. and then treated while being stirred with a solution of 5.71 grams (27.7 millimols) of dicyclohexyl-carbodiimide in 12.5 cc. of ice-cold acetonitrile and the whole is allowed to react for 22 hours at 0° C. The urea is filtered off and the filtrate is concentrated in vacuum to a small volume. The syrupy residue is taken up in chloroform, washed with 3 x 10 cc. of N-hydrochloric acid, then with 2 x 10 cc. of water and finally with N-sodium bicarbonate solution and N-sodium carbonate solution until, when the alkaline extracts are acidified, no more precipitate or turbidity appears. Finally, the chloroform extracts are washed neutral with water and dried over sodium sulfate and evaporated, to yield 10.4 grams (=62% of theory) of crude carbobenzoxy-tripeptide ester.

When a sample of the crude product is subjected to scission with 2 N-hydrogen bromide solution in glacial acetic acid for one hour at room temperature there appears in the paper chromatogram in the systems 54 and 49 apart from the tripeptide also a further amount of nitro-arginine and another by-product. For purification 4.6 grams of the crude product are crystallized from 140 cc. of butanol. Yield: 2.2 grams of pure carbobenzoxy-tripeptide ester melting at 120° C. with decomposition. Optical rotation $[\alpha]_D^{26} = -43.9° \pm 1°$ (c.=1.032 in methanol).

The ultraviolet spectrum of the carbobenzoxy-tripeptide ester displays at 271 mμ the maximum typical of nitro-arginine ($\epsilon$=32,200).

Example 5

H-Arg(NO₂)-Arg(NO₂)-Pro-OCH₃

A mixture of 2.19 grams (3.3 millimols) of Z-Arg-(NO₂)-Arg(NO₂)-Pro-OCH₃ and 13.2 cc. of 2 N-hydrobromic acid solution in glacial acetic acid is decarbobenzoxylated for one hour at room temperature. The excess acid is evaporated and the decarbobenzoxylation product is precipitated with much absoluate ether. The crude product is taken up in 2 cc. of water, extracted twice with fresh ethyl acetate, the ethyl acetate phases are once again washed with water and the combined aqueous solutions are poured over a column of ion-exchanger Merck II. The free tripeptide ester is eluted with 200 cc. of water and the water is then evaporated in vacuum at 40° C. Yield: 1.3 grams (=74% of the theoretical).

The paper chromatogram in the systems 43, 49 and 54 of the free tripeptide ester produces with ninhydrin only one positive spot each.

$R_f$ values: 43/0.42, 49/0.67 and 54/0.49.

Example 6

T-Lys(BOC)-Lys(BOC)-Arg(NO₂)-Arg(NO₂)-Pro-OCH₃

1.07 grams (2.01 millimols) of H-Arg(NO₂)-Arg(NO₂)-Pro-OCH₃ in 16.5 cc. of a 1:1-mixture of dimethylformamide and acetonitrile are cooled to −10° C. While stirring the mixture vigorously there are rapidly added 1.44 grams of T-Lys(BOC)-Lys(BOC-OH) (afore-mentioned U.S. patent application No. 46893), the hole is diluted with 10 cc. of previously cooled acetonitrile and after 10 minutes 456 mg. (2.2 millimols) of dicyclohexyl carbodiimide in 5 cc. of ice-cold acetonitrile are added. The mixture is allowed to react for 20 hours at 0° C.; the urea is then filtered off and the filtrate is evaporated in vacuum at 40° C. The unreacted tripeptide ester is precipitated with much ethyl acetate and the ethyl acetate solution is then evaporated to dryness and the residue is taken up in a small amount of acetone. The mixture is filtered through cotton wool and the N-trityl-pentapeptide ester is precipitated with much ether.

A specimen of the trityl-pentapeptide ester split with anhydrous trifluoroacetic acid reveals in the paper chromatogram in the system 49, in addition to the pentapeptied methyl ester ($R_f$=0.29), a very small amount of the two starting materials [dipeptide-H-lys-lys-OH ($R_f$=0.12) and tripeptide ester nitro-arginyl-nitro-arginyl-proline methyl ester ($R_f$=0.53)].

For analysis 200 mg. of the product are subjected to a Craig distribution over 100 stages between methanol of 80% strength and a 1:1-mixture of chloroform and carbon tetrachloride. The bulk of the substance (180 mg.) is found in stages 16–28 which are combined and once more precipitated from acetone+ether. Melting point: 134–136° C. Optical rotation $$[\alpha]_D^{26} = -41.20 \pm 0.4°$$

(c.=2.709 in methanol). Ultra-violet spectrum: $\lambda_{max}$ 271 mμ, $\epsilon$=32 500, in absolute alcohol.

Example 7

H-Lys(BOC)-Lys(BOC)-Arg(NO₂)-Arg(NO₂)-Pro-OCH₃

1.46 grams (1.19 millimols) of Nα-trityl-pentapeptide methyl ester (Example 6) in 50 cc. of acetic acid of 75% strength are subjected to splitting for 45 minutes at 30° C.; the acetic acid is then evaporated in a high vacuum at 30° C. and the residue is distributed between acetic acid of 1% strength and ether. On evaporation of the ethereal solution a quantitative yield of triphenyl carbinol is obtained. The acetic acid solution is likewise evaporated in a high vacuum at 40° C. and the residue distributed in a separating funnel between butanol and N-sodium carbonate solution. The pH valve of the aqueous phase must be 8.5. The butanol extracts are washed with water until neutral and then dried over sodium sulphate. Yield: 1.03 grams (=88% of the theoretical).

The compound is used for further working up without first having been purified.

Example 8

PZ-Lys(BOC)-Pro-Val-Gly-Lys(BOC)-Lys(BOC)-Arg(NO₂)-Arg(NO₂)-Pro-OCH₃

A mixture of 900 mg. (1.2 millimols) of PZ-Yys(BOC)-Pro-Val-Gly-hydrazide and 10 cc. of dimethylformamide is cooled to −10° C. 4 cc. of N-hydrochloric acid are then slowly run in, whereupon 1.4 cc. of ice-cold N-sodium nitrate solution are vigorously stirred in dropwise at −10° C. After 30 seconds the azide begins to separate out as a sticky substance. The mixture is allowed to react for another 3 minutes at −10° C. and then treated with 150 cc. of ice water. The tacky azide, which is difficult to filtrate, is extracted with ice-cold ethyl acetate and the ethyl acetate phases are washed 3 times with water until neutral, then dried in the cold over magnesium sulfate and filtered through a cold G4-glass suction filter into an icecooled solution of 1.03 grams (about 1 millimol) of H-lys(BOC)-Lys(BOC)-Arg(NO₂)-Arg(No₂)-Pro-OCH₃. The mixture is allowed to react for 22 hours at 0° C. and then for 3 hours at 30° C. The reaction solution is washed with 40 cc. of water, then with 4 x 10 cc. of acetic acid solution of 1% strength, then with 5 x 10 cc. of N-sodium bicarbonate solution and finally with water and saturated sodium chloride solution. On evaporation of the dried solution the nonapeptide derivative settles out. Yield: 1.70 grams of crude product.

For purification 1.52 grams of the crude product are taken up in a small amount of chloroform and then filtered through a column of 45 grams of silica gel. One reprecipitation of the eluate from 10 cc. of chloroform with ether yields 1.06 grams of PZ-nonapeptide methyl ester, melting at 134 to 140° C. with decomposition.

In the thin-layer chromatogram (silica gel G; product of Merck) in the system dioxane: water=9:1 only one substance of $R_f$ value 0.75 can be identified. In the systems chloroform: acetone=7:3 and benzene: acetone=1:1 the compound remains at the starting point. The substance, crystallized from acetonitrile, melts at 136–138° C.; it exhibits in the UV-spectrum in ethanol maxima at λ=277 mμ ($\epsilon$=26600) and λ=320 mμ ($\epsilon$=22400).

Example 9

PZ-Lys(BOC)-Pro-Val-Gly-Lys(BOC)-Lys(BOC)-Arg(NO₂)-Arg(NO₂)-Pro-OH

A mixture of 1.06 grams (0.62 millimol) of PZ-nonapeptide ester (Example 8), 6 cc. of dioxane of 75% strength and 1.24 cc. of 1.95 N-sodium hydroxide solution is hydrolysed for 15 minutes at room temperature. The reaction solution is then poured into 110 cc. of ice water containing 2.5 cc. of N-hydrochloric acid and the fluoccular precipitate is filtered through a G3 glass suction filter. The precipitate is thoroughly washed with water and then dried over phosphorus pentoxide in a high vacuum to yield 970 mg. of an amorphous product. $R_f$ value in the thin-layer chromatogram=0.52 for dioxane:water=9:1.

200 mg. of the product distributed over 121 stages in the system methanol:water:chloroform:carbontetrachloride=8:2:5:5 yield 162 mg. of the pure peptide derivative of K-value=0.65.

Ultra-violet spectrum in absolute alcohol: $\lambda_{max}$ 320 m$\mu$ ($\epsilon$=21700) and 271 m$\mu$ ($\epsilon$=37200).

The substance, crystallized from acetonitrile, melts at 140–145° with decomposition.

Example 10

PZ-Val-Lys(BOC)-OH

A mixture of 4.75 grams (13.4 millimols) of PZ-valine and 65 cc. of absolute dioxane is cooled in ice water in a manner such that part of the dioxane is solid. There are then added 3.45 cc. (14.4 millimols) of N-tributylamine and after another 5 minutes 1.38 cc. (13.4 millimols) of chloroformic acid ethyl ester and the whole is allowed to react for 15 minutes while being cooled.

4 grams (17.2 millimols) of N$^\epsilon$-BOC-lysine are slowly stirred into 32 cc. of water containing 2.45 cc. (17.2 millimols) of N-triethylamine. The last portions of N$^\epsilon$-BOC-lysine do not dissolve readily. On cooling with ice a small amount of solid matter separates again from the aqueous solution. This solution is rapidly added with vigorous stirring and cooling to the freshly prepared solution of the mixed anhydride and the mixture is allowed to react for 30 minutes at room temperature. The reaction solution is concentrated in vacuum at 40° C. to a small volume and then treated, while being cooled with ice, with 100 cc. of water and 40 cc. of citric acid solution of 10% strength. When the smeary precipitate is rubbed with ether it turns solid. The crude PZ-valyl-N$^\epsilon$-BOC-lysine is filtered off, washed copiously with water and ether and dried in a high vacuum at 50° C. Yield: 4.41 grams. Melting point: 167–169° C. (after sintering at 165° C.).

The ethereal phase is separated and dried over sodium sulfate. When the ether is evaporated, another 1.07 grams of the PZ-dipeptide separate; melting point 167–169° C.

The total yield amounts to 5.48 grams (=70% of the theoretical). After having been crystallized once from ethyl acetate the analytical fraction melts at 167–169° C.

The ultra-violet spectrum in absolute alcohol displays maxima at 230 m$\mu$ ($\epsilon$=13400) and at 322 m$\mu$ ($\epsilon$=23000).

Example 11

Z-Val-Tyr-Pro-OtBu 11.25 grams (27.4 millimols) of carbobenzoxy-valyl-tyrosine (U.S. Patent No. 2,978,444, granted April 4, 1961 to R. Schwyzer et al.), in 100 cc. of freshly distilled acetonitrile are mixed with a solution of 4.65 grams (27.4 millimols) of proline tertiary butyl ester in 25 cc. of acetonitrile and cooled in an ice bath to 0° C. A solution of 6.21 grams of dicyclohexy carbodiimide in 10 cc. of cold acetonitrile is then added and the mixture is allowed to react for 15 hours at 0° C. The urea which crystallizes out is filtered off (yield: 90% of the theoretical) and the reaction solution is mixed with 1 cc. of glacial acetic acid. After 15 minutes the acetonitrile is evaporated in vacuum, the residue is taken up in ethyl acetate and the precipitated urea is once more filtered off. The ethyl acetate solution is extracted with 2 x 10 cc. of ice-cold 2 N-hydrochloric acid, and then with 2 N-sodium carbonate solution until an acidified sample no longer produces a precipitate, and finally with water until neutral. The ethyl acetate extracts are dried over sodium sulfate and evaporated under diminished pressure. Yield: 14.1 grams (=88% of the theoretical) of amorphous carbobenzoxy-tripeptide ester.

This carbobenzoxy-tripeptide ester is readily soluble in most organic solvents except ether, petroleum ether and benzene. It is further worked up without first having been purified.

Example 12

H-Val-Tyr-Pro-OtBu 14.13 grams (24.9 millimols) of Z-Val-Tyr-Pro-OtBu in 250 cc. of methanol of 90% strength containing 4.5 cc. of glacial acetic acid are subjected to hydrogenolytic splitting in the presence of 2 grams of palladium-carbon catalyst of 10% strength. The liberated carbon dioxide is absorbed with potassium hydroxide solution in a second interposed duck-shaped hydrogenation vessel. After 2 hours no more hydrogen is being taken up. The catalyst is filtered off and the filtrate is evaporated to dryness in vacuum at 40° C.; the residue is distributed between 200 cc. of ethyl acetate and 2 x 20 cc. of ice-cold 2 N-sodium carbonate solution. The sodium carbonate solutions are once more extracted with fresh ethyl acetate and the ethyl acetate extracts are washed with water until neutral and then dried over sodium sulfate. Evaporation in vacuum yields 7.69 grams (=71% of theory) of the free tripeptide ester.

In the paper chromatogram in the systems 43, 45 and 54 the tripeptide ester migrates with the solvent front and produces with ninhydrin and Pauly reagent one spot each.

Example 13

PZ-Val-Lys(BOC)-Val-Tyr-Pro-OtBu

A solution of 10.36 grams (17.7 millimols) of PZ-Val-Lys(BOC)-OH and 7.69 grams (17.7 millimols) of H-Val-Tyr-Pro-OtBu in 140 cc. of freshly distilled dimethylformamide is treated at 0° C. with 4.2 grams of dicyclohexyl carbodiimide (15% excess) in 12 cc. of dimethylformamide, and the whole is kept for 2 days at 0° C. The urea is filtered off and the filtrate mixed with 0.5 cc. of glacial acetic acid and left to itself for another 30 minutes. The solvent is then evaporated in vacuum to leave a small volume and the syrupy residue is taken up in much ethyl acetate. The ethyl acetate phase is washed with 4 x 25 cc. of 0.2 N-ammonium hydroxide solution, 2 x 30 cc. of water, 2 x 30 cc. of ice-cold citric acid solution of 10% strength and finally with water until it is neutral. After drying with sodium sulfate and evaporating the solvent there are obtained 17 grams of crude amorphous reaction product. For purification the crude product is dissolved in 100 cc. of chloroform and the solution is poured over a silica gel column (570 grams: diameter 5.6 cc., 41 cm. high) disactivated with 10% of water. On elution with chloroform the orange-red zone migrates slowly, whereas with 2:1 chloroform+ ethyl acetate 2 fractions can be eluted.

The first fraction (4.8 grams) is still considerably contaminated with dicyclohexylurea and PZ-dipeptide and can be crystallized from acetonitrile only in a poor yield, whereas the second fraction (7.2 grams) is again obtained as a gelatinous precipitate from 200 cc. of acetonitrile. Yield: 5.1 grams of PZ-pentapeptide ester melting at 154–158° C.

The analytically pure fraction, obtained by a further crystallization, melts at 157–159° C.

The ultra-violet spectrum of the compound in absolute alcohol displays maxima at 227 m$\mu$ ($\epsilon$=20700) and 322 m$\mu$ ($\epsilon$=21100).

In the thin-layer chromatogram (silica gel G; product of Merck) the $R_f$-values revealed are:

0.23 (chloroform+acetone 95:5) and
0.60 (benzene+acetone 1:1).

Example 14

H-Val-Lys(BOC)-Val-Tyr-Pro-OtBu

A mixture of 1.4 grams of PZ-Lys(BOC)-Val-Tyr-Pro-

OtBu, 100 cc. of methanol and 400 mg. of palladiumcarbon catalyst of 10% strength is shaken for 6 hours in an autoclave with hydrogen under 5 atmospheres pressure. The catalyst is filtered off, repeatedly washed with methanol and the solvent is evaporated in vacuum. The residue is triturated with much ether and dried in a high vacuum. 980 mg. of a fine, amorphous powder is obtained.

In the systems 54 and 49 the compound migrates with the solvent front.

The $R_f$ value is 0.65 in the thin-layer chromatogram (silica gel G) in the system dioxane+water 9:1.

*Example 15*

PZ-Lys(BOC)-Pro-Val-Gly-Lys(BOC)-Lys(BOC)-Arg($NO_2$)-Arg($NO_2$)-Pro-Val-Lys(BOC)-Val-Tyr-Pro-OtBu 276 mg. (0.16 millimol) of PZ-Lys-Pro-Val-Gly-Lys(BOC)-Lys(BOC)-Arg($NO_2$) - Arg($NO_2$) - Pro - $OCH_3$ (dried over phosphorus pentoxide in a high vacuum at 80° C.) are dissolved in a mixture of 1 cc. of absolute dimethylformamide and 2 cc. of absolute tetrahydrofuran and the whole is cooled to —10° C. in a cooling bath of ice and sodium chloride. 0.16 millimol of triethylamine in 1.6 cc. of tetrahydrofuran is then added and after 5 minutes 0.16 millimol of chloroformic acid isobutyl ester in 1.6 cc. of absolute tetrahydrofuran is introduced. The whole is allowed to react in the cooling bath for 15 minutes and then treated with a solution of 140 mg. of H-Val-Lys(BOC)-Val-Tyr-Pro-OtBu in 2 cc. of absolute tetrahydrofuran, stirred for 15 minutes in an ice bath and then for 1 hour at room temperature; the solvent is then evaporated in vacuum at 40° C. and the reaction product is precipitated with much ether. The dried crude product (395 mg.) in 4 cc. of alcohol-free chloroform is poured over a column of alumina (activity III; 40 grams) and eluted with 100 cc. of chloroform. The yellow zone containing the peptide derivative migrates slowly. The whole is then eluted with 80 cc. of chloroform+methanol 95:5, to yield 290 mg. of chromatographically unitary product. $R_f$ value (dioxane+water 9:1)=0.75 in the thin-layer chromatogram.

The substance melts, when crystallized from acetonitrile, at 160–165° C. The UV-spectrum in ethanol exhibits maxima at $\lambda=272$ m$\mu$ ($\epsilon=36800$) and 319 m$\mu$ ($\epsilon=20400$).

*Example 16*

H-Lys(BOC)-Pro-Val-Gly-Lys(BOC)-Lys(BOC)-Arg-Arg-Pro-Val-Lys(BOC)-Val-Tyr,Pro-OtBu, $3CH_3COOH$

A mixture of 320 mg. of PZ-tetradecapeptide tertiary butyl ester (Example 14), 6 cc. of acetic acid of 90% strength and 100 mg. of palladium-carbon catalyst of 10% strength is shaken for 5 hours with hydrogen under a pressure of 5 atmospheres (gauge). The reaction solution is then poured into a duck-shaped hydrogenation vessel and shaken for another 17 hours with 100 mg. of fresh palladium catalyst under normal conditions. To absorb the carbon dioxide formed, another duck-shaped hydrogenation vessel filled with potassium hydroxide solution is interposed. The catalyst is then filtered off and thoroughly washed with acetic acid of 90% strength and with methanol, and the whole is evaporated to dryness in vacuum to yield 220 mg. of a white amorphous powder.

The ultra-violet spectrum in absolute alcohol displays at 278 m$\mu$ the maximum ($\epsilon=1500$) typical of tyrosin.

In the paper-chromatogram in the systems 49, 50 and 54 the compound migrates with the solvent front and produces positive reactions with ninhydrin and Pauly and Sakaguchi reagents.

*Example 17*

BOC-Ser-Tyr-Ser-Met-Glu(O-tBu)-His-Phe-Arg-Try-Gly-Lys(BOC)-Pro-Val-Gly-Lys(BOC)-Lys(BOC)-Arg-Arg-Pro-Val-Lys(BOC)-Val-Tyr-Pro-OtBu 210 mg. of tetradecapeptide tertiary butyl ester (Example 16) are rapidly dissolved at 0° C. in 10 cc. of 0.1 N- hydrochloric acid and the resulting solution is subjected to lyophilization in a high vacuum. The fine, white residue is then further dried for 2 hours at 50° C. in a high vacuum over phosphorus pentoxide. At the same time, 160 mg. (0.11 millimol) of BOC-Ser-Tyr-Ser-Met-Glu(OtBu)-His-Phe-Arg-Try-Gly - OH (afore-mentioned patent application No. 114,636 are dissolved with heating in 1 cc. of freshly distilled dimethylformamide, cooled to room temperature and added to the trihydrochloride of the tetradecapeptide, then diluted with another 2.5 cc. of dimethylformamide, and after 10–15 minutes a clear solution is obtained, which is kept for 2 hours in an ice bath. 42 mg. (0.2 millimol) of dicyclohexyl-carbodiimide in 0.6 cc. of ice-cold acetonitrile are then added, and the mixture is allowed to react for 13 hours at 0° C. and then for 48 hours at room temperature. The crude reaction product is then precipitated with much ethyl acetate and dried in a high vacuum at 40° C. Yield of crude product: 330 mg.

*Example 18*

H-Ser-Tyr-Ser-Met-Glu-His-Phe-Arg-Tyr-Gly-Lys-Pro-Val-Gly-Lys-Lys-Arg-Arg-Pro-Val-Lys-Val-Tyr-Pro-OH, $CH_3 \cdot COOH$ 100 mg. of crude, protected tetracosapeptide (Example 17; still contaminated with starting peptides) are treated for 1 hour at room temperature with 2 cc. of anhydrous trifluoro-acetic acid. The excess acid is evaporated in vacuum at room temperature and the resulting residue is triturated with much absolute ether. The amorphous scision product is subjected to continuous high voltage electrophoresis (700 volts; 30 milliamperes) in 4.5 cc. of 0.5 N-acetic acid. Rate of application: 1 cc. per hour. In all, 23 fractions are collected. The fractions 1–9, 10, 12–13, 14–15, 16 and 17–23 are evaporated. As revealed by electrophoretic analysis, the bulk of the desired tetracosapeptide is contained in fractions 2–15. For puification the combined fractions 12–15 are dissolved in 2 cc. of 0.01-molar ammonium acetate buffer and poured over a column of carboxy methylcellulose (diameter 1 cm., height: 1.16 cm.; 2.5 grams). The carboxymethylcellulose is introduced into the column with 100 cc. of 0.01-molar ammonium acetate buffer and then eluted with another 50 cc. of the same buffer. The peptide is then eluted from the column with ammonium acetate buffer (pH=5.4) of increasing molarity (0.1–m. to 0.7–m.).

Fractions of 10 cc. volume each are collected in an automatic fraction collector. After 15 fractions, the peptide has been quantitatively removed from the column. A total of 15 fractions is obtained. The vessels 10 to 13 contain electrophoretically pure tetracosapeptide. The path covered after 1 hour at 3000 volts and pH=1.9 is 13 to 17 cm.

In the in-vitro test according to Saffran and Schally the peptide obtained revals a considerable adrenocorrticotropic activity.

*Example 19*

A solution of 5.1 mg. (about $1.5 \times 10^{-6}$ mol) of the above tetracosapeptide in 2.0 ml. of 0.1 N-potassium chloride solution is treated with 0.020 ml. of 0.1 N-hydrochloric acid and 0.020 ml. of 0.1-molar zinc sulfate solution. The solution thus contains: $HCl:2 \times 10^{-6}$; $Zn^{+2}$ $2 \times 10^{-6}$ mol; tetracosapeptide: about $1.5 \times 10^{-6}$ mol.

The solution is titrated with 0.1 N-sodium hydroxide solution. The titration curve shows a zinc complex with pK=8.35. At and above the pH of 8.35, the sparingly soluble complex begins to precipitate in the form of a very finely divided gel. It is centrifuged off at a pH of 9.5 and washed with water. The complex has a strong ACTH-activity.

Example 20

1 injection vial contains:

|  | (a) | (b) |
|---|---|---|
| 30920,[1] mg | 1 | 3 |
| Mannitol, mg | 10 | 10 |

[1] 30920=H-Ser-Tyr-Ser-Met-Glu-His-Phe-Arg-Try-Gly-Lys-Pro-Val-Gly-Lys-Lys-Arg-Arg-Pro-Val-Lys-Val-Tyr-Pro-OH, CH₃COOH.

METHOD

30920[1] and mannitol are disolved in water for the purpose of injection, so that 1.0 ml. of solution contains 1 mg. and 3 mg. of 30920[1] respectively and 10 mg. of mannitol. The solution is filtered under sterile conditions and is put into sterilized injection vials of 1.0 ml. each under aseptic conditions and lyophilized in the conventional manner. The vials are then sealed under aseptic conditions.

What is claimed is:

1. A member selected from the group consisting of the tetracosapeptide of the formula L-seryl-L-tyrosyl-L-seryl - L - methionyl - L - glutamyl - L - histidyl - L - phenylalanyl - L - arginyl - L - tryphophyl - glycyl - L - lysyl - L - prolyl - L - valyl - glycyl - L - lysyl - L - lysyl - L - arginyl - L - arginyl - L - prolyl - L - valyl - L - lysyl - L - valyl - L - tryrosyl - L - proline, its derivatives selected from the group consisting of lower alkyl esters, benzyl ester, p-nitro-benzyl ester, the unsubstituted amide and the aydrazide, non-toxic acid addition salts, and corresponding compounds in which the amino groups are protected by a protective group selected from the group consisting of tosyl, trityl, carbobenzoxy, paraphenylazobenzyloxycarbonyl, para - (para' - methoxy - phenylazo) - benzlyoxycarbonyl and tertiary butyloxycarbonyl.

2. A member selected from the group consisting of the tetracosapeptide of the formula L-seryl-L-tyrosyl-L-seryl - L - methionyl - L - glutaminyl - L - histidyl - L - phenylalanyl - L - arginyl - L - tryptophyl - glycyl - L - lysoyl - L - prolyl - L - valyl - glycyl - L - lysyl - L - lysyl - L - arginyl - L - arginyl - L - prolyl - L - valyl - L - lysyl - L - valyl - L - tyrosyl - L - proline, its derivatives selected from the group consisting of lower alkyl esters, benzyl ester, p-nitor-benzyl ester, the unsubstituted amide and the hydrazide, non-toxic acid addition salts, and corresponding compounds in which the amino groups are protected by a protective group selected from the group consisting of tosyl, trityl, carbobenzoxy, paraphenylazobenzyloxycarbonyl, para - (para' - methoxy - phenylazo) - benzyloxycarbonyl and tertiary butyloxycarbonyl.

[1] 30920=H-Ser-Tyr-Ser-Met-Glu-His-Phe-Arg-Try-Gly-Lys-Pro-Val-Gly-Lys-Lys-Arg-Arg-Pro-Val-Lys-Val-Tyr-Pro-OH, CH₃COOH.

3. A member selected from the group consisting of the tetracosapeptide of the formula L - seryl - L - tyrosyl - L - seryl - L - methionyl - L - glutamyl - L - histidyl - L - phenylalanyl - L - arginyl - L - tryptophyl - glycyl - L - lysyl - L - prolyl - L - valyl - glycyl - L - lysyl - L - lysyl - L - arginyl - L - arginyl - L - prolyl - L - valyl - L - lysyl - L - valyl - L - tyrosyl - L - proline in pure form, its derivatives selected from the group consisting of lower alkyl esters, benzyl ester, p-nitro-benzyl ester, the unsubstituted amide and the hydrazide, non-toxic acid addition salts, and corresponding compounds in which the amino groups are protected by a protective group selected from the group consisting of tosyl, trityl, carbobenzoxy, paraphenylazobeinzyloxycarbonyl, para - (para' - methoxyphenlyazo) - benzyloxycarbonyl and tertiary butyloxycarbonyl.

4. A member selected from the group consisting of the tetracosapeptide of the formula L - seryl - L - tyrosyl - L - seryl - L - methionyl - L - glutaminyl - L histidyl - L - phenlyalanyl - L - arginyl - L - tryptophyl - glycyl - L - lysyl - L - prolyl - L - valyl - glycyl - L - lysyl - L - lysyl - L - arginyl - L - arginyl - L - prolyl - L - valyl - L - lysl - L - valyl - L - tyrosyl - L - proline in pure form, its derivatives selected from the group consisting of lower alkyl esters, benzyl ester, p-nitro-benzyl ester, the unsubstituted amide and the hydrazide, non-toxic acid addition salts and heavy metal complexes with a member selected from the group consisting of zinc, copper and cobalt, and corresponding compounds in which the amino groups are protected by a protective group selected from the group consisting of tosyl, trityl, carbobenzoxy, paraphenylazobenzyloxycarbonyl, para - (para' - methoxy - phenylazo)-benzyloxycarbonyl and tertiary butyloxycarbonyl.

References Cited by the Examiner

Greenberg: Amino Acids and Proteins, pages 477–479 (1951).
Harris: Nature, vol. 178, page 90 (1956).
Hoffman: J.A.C.S., vol. 83, pages 2286–99 (1961).
Hoffman: J.A.C.S., vol. 82, pages 3715–21 (1960).
Hoffman: J.A.C.S., vol. 79, pages 1636–41; 6087–88 (1957).
Schwyzer: Nature, vol. 182, pages 1669–70 (1958).
Shepherd: J.A.C.S., vol. 78, pages 5067–76 (1956).
White: J.A.C.S., vol. 77, pages 1711–12 (1955).

LEWIS GOTTS, *Primary Examiner.*

LEON ZITVER, *Examiner.*

DENNIS P. CLARKE, PERRY A. STITH,
*Assistant Examiners.*